(12) United States Patent
Ridderbusch et al.

(10) Patent No.: US 9,856,849 B2
(45) Date of Patent: Jan. 2, 2018

(54) LASER IGNITION SYSTEM

(71) Applicant: Robert Bosch GmbH, Stuttgart (DE)

(72) Inventors: Heiko Ridderbusch, Schwieberdingen (DE); Joern Ostrinsky, Ditzingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 12 days.

(21) Appl. No.: 14/766,343

(22) PCT Filed: Feb. 7, 2014

(86) PCT No.: PCT/EP2014/052472
§ 371 (c)(1),
(2) Date: Aug. 6, 2015

(87) PCT Pub. No.: WO2014/122281
PCT Pub. Date: Aug. 14, 2014

(65) Prior Publication Data
US 2015/0377207 A1    Dec. 31, 2015

(30) Foreign Application Priority Data

Feb. 11, 2013 (DE) .................. 10 2013 202 184
Dec. 16, 2013 (DE) .................. 10 2013 226 119

(51) Int. Cl.
*F02P 23/04*    (2006.01)
*H01S 5/00*    (2006.01)
(Continued)

(52) U.S. Cl.
CPC ............... *F02P 23/04* (2013.01); *H01S 3/00* (2013.01); *H01S 5/005* (2013.01); *H01S 3/005* (2013.01); *H01S 3/0627* (2013.01); *H01S 3/113* (2013.01)

(58) Field of Classification Search
CPC ... F02P 15/08; F02P 23/04; H01S 3/00; H01S 3/0627; H01S 3/065; H01S 3/09;
(Continued)

(56) References Cited

U.S. PATENT DOCUMENTS

| 4,416,226 | A | | 11/1983 | Nishida et al. | |
| 5,367,869 | A | * | 11/1994 | DeFreitas | F02C 7/264 |
| | | | | | 60/39.821 |

(Continued)

FOREIGN PATENT DOCUMENTS

| DE | 10 2013 202 165 | 8/2013 |
| EP | 0 816 674 | 1/1998 |

(Continued)

OTHER PUBLICATIONS

International Search Report for PCT/EP2015/052472, dated Jun. 24, 2014.
Koga et al. (Journal of Physics D 43 (2010), 025204).

*Primary Examiner* — John Kwon
*Assistant Examiner* — Johnny H Hoang
(74) *Attorney, Agent, or Firm* — Norton Rose Fulbright US LLP; Gerard Messina

(57) ABSTRACT

A laser ignition system has: at least one arrangement for producing a pulsed laser beam; and at least one arrangement for focusing the produced pulsed laser beam onto a focus zone, e.g., in order to ignite a combustible gas mixture in an internal combustion engine or a burner. The laser ignition system is designed to produce a pulsed laser beam having a normed fluence volume greater than 0.1.

19 Claims, 5 Drawing Sheets

(51) Int. Cl.
*H01S 3/06* (2006.01)
*H01S 3/113* (2006.01)
*H01S 3/00* (2006.01)

(58) Field of Classification Search
CPC ...... H01S 3/113; H01S 3/1611; H01S 3/1643; H01S 5/005
USPC ................. 123/143 R, 143 A, 143 B, 169 R, 123/594–596
See application file for complete search history.

(56) References Cited

U.S. PATENT DOCUMENTS

| | | | |
|---|---|---|---|
| 5,404,712 A | 4/1995 | Few et al. | |
| 7,040,270 B2 * | 5/2006 | Herdin | F02P 23/04 123/143 B |
| 7,757,650 B2 * | 7/2010 | Hanenkamp | F02M 21/02 123/143 R |
| 8,689,536 B2 * | 4/2014 | Kopacek | F02C 7/264 356/317 |
| 8,701,612 B2 * | 4/2014 | Gruber | F02P 23/04 123/143 B |
| 8,833,323 B2 * | 9/2014 | Weyl | F02C 7/264 123/143 B |
| 8,844,491 B2 * | 9/2014 | Weinrotter | F02B 19/04 123/143 B |
| 2009/0133654 A1 * | 5/2009 | Bihari | F02P 5/1512 123/143 B |
| 2013/0186362 A1 * | 7/2013 | Kanehara | F02P 15/08 123/143 B |
| 2014/0041612 A1 * | 2/2014 | Furutani | F02P 23/04 123/143 B |

FOREIGN PATENT DOCUMENTS

| | | |
|---|---|---|
| EP | 1 693 566 | 8/2006 |
| EP | 1 767 777 | 3/2007 |
| JP | H08-505676 A | 6/1996 |
| JP | 2006-144618 A | 6/2006 |
| JP | 2006-242035 A | 9/2006 |
| JP | 2010-121482 A | 6/2010 |
| JP | 2010-138818 A | 6/2010 |
| WO | WO 94/08131 | 4/1994 |
| WO | WO 2005/021959 | 3/2005 |
| WO | 2012/137384 A1 | 10/2012 |

\* cited by examiner

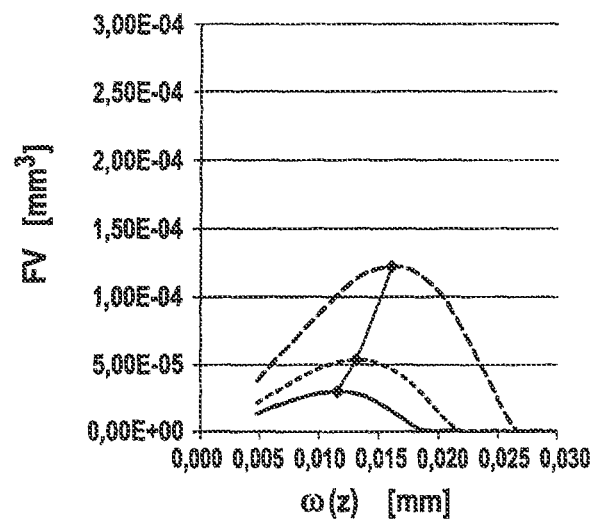
a)
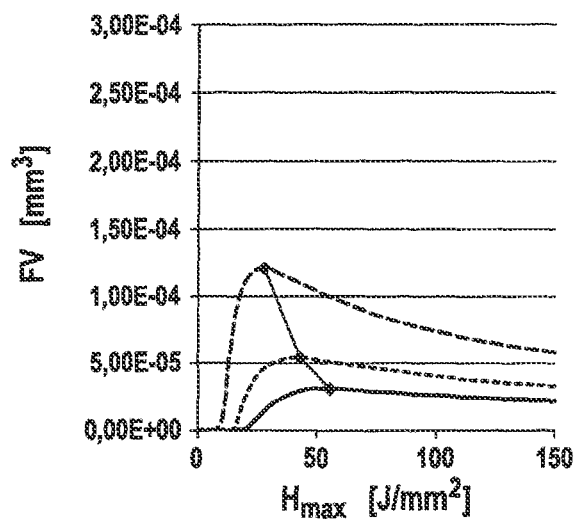
b)
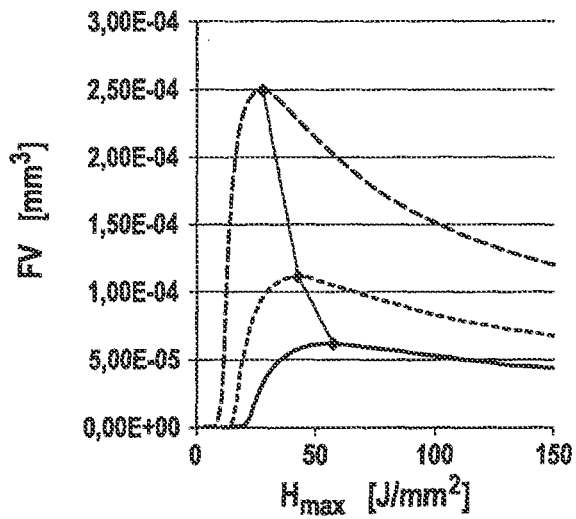
c)
FIG. 3

LASER IGNITION SYSTEM

BACKGROUND OF THE INVENTION

1. Field of the Invention

The present invention relates to a laser ignition system having at least one means for producing a pulsed laser beam and at least one means for focusing the produced pulsed laser beam onto a focal zone, for example in order to ignite a combustible gas mixture in an internal combustion engine or burner.

2. Description of the Related Art

In current laser applications for laser ignition, a main focus of attention is achieving the smallest possible focusability of the laser light. Through the use of optical equipment having a large numerical aperture (DIN 58629-1), the goal is pursued of achieving the smallest possible beam diameter with the greatest possible intensity (power per surface=power density) in the focal zone. Koga et al. (Journal of Physics D 43 (2010), 025204) showed that, in addition to a threshold intensity, a minimum energy or minimum fluence (energy per surface=energy density) in the focal point is necessary for the ignition of a plasma.

However, it has turned out that despite high realized intensities, in particular given lean mixtures disadvantageous effects occur in laser ignition, such as misfires, which could result in engine failure. Associated with this is a lack of smooth running of the engine. The resulting increase in emission of pollutants has a negative influence on the competitiveness of laser ignition systems compared to conventional electrical ignition systems.

BRIEF SUMMARY OF THE INVENTION

Accordingly, the object of the present invention is to improve a laser ignition system of the type indicated above so that the described disadvantages are removed or minimized.

According to the present invention, in the ignition system of the type named above this object is achieved in that the laser ignition system is designed to produce a pulsed laser beam having a normed fluence volume greater than 0.1.

The provision according to the present invention of the production of a pulsed laser beam having a normed fluence volume greater than 0.1 is particularly advantageous because in this way a plasma formation in a relatively large volume is achieved.

Developments of the present invention provide a normed fluence volume that is even greater than 0.3 or 0.5. It is advantageous that the achieved fluence volume is very close to the maximum possible fluence volume, and in this way the probability of ignition is close to optimal.

In this context, for the definition of the fluence volume a minimum energy density, also called minimum fluence, is used, which in principle can be selected to be suitable. For example, depending on the intended ignition mixture, the determination of the minimum fluence can be carried out in a suitable manner. For example, a minimum fluence of 20 J/mm$^2$ can be assumed, which has turned out to be suitable in particular for an air-methane mixture of 3 bar. In order to produce a plasma in air (air ionization) at room temperature and standard atmospheric pressure, for example a minimum fluence of 15 J/mm$^2$ is sufficient. Depending on the system and external boundary conditions, e.g. higher temperature or higher pressure, the required minimum fluence for a system can also be 10 J/mm$^2$ or 20 J/mm$^2$ or 25 J/mm$^2$ or 30 J/mm$^2$.

The present invention is based on the recognition that achieving the minimum fluence in a relatively large volume corresponds to a comparatively homogenous distribution of the existing energy of the laser pulses to a volume that is as large as possible. In this way, it is achieved that, following the formation of a plasma in the focus zone, an ignition of a fuel mixture will occur with increased probability. In this way, misfirings are avoided and the smooth running of the internal combustion engine is improved. In this way, even fuel mixtures that are quite lean, i.e. have a high degree of excess air, can be ignited comparatively reliably. This is advantageous because as a rule the efficiency of an internal combustion engine increases as the lean burning capacity of the gas mixture to be ignited increases.

In the case of a relatively small, even if relatively intense, plasma, in contrast there is an increased probability that the gas mixture will not be ignited, but rather the energy of the produced plasma will be lost, e.g. in the form of sound waves.

The volume within which the minimum fluence is exceeded is designated the fluence volume. The normed fluence volume results from the fluence volume for given laser beam features at a specified numerical aperture of the focusing, normed to the maximum possible fluence volume.

Here, the term "laser beam features" refers in particular to the pulse energy and the beam quality M$^2$ (DIN EN ISO 11146-1).

The maximum possible fluence volume is the maximum fluence volume that can theoretically be achieved for a given laser ignition system through variation of the numerical aperture, e.g. by exchanging the focusing lens or changing the illumination of the lens, while at the same time holding constant the parameters minimum fluence and the laser beam features, in particular the pulse energy, the beam quality M$^2$, and the wavelength.

As explained above, the boundary for the determination of the fluence volume is drawn at the minimum fluence. Typically, the minimum fluence has a value of from $\frac{1}{10}$ to $\frac{1}{2}$ of the maximum fluence. The maximum fluence is the highest fluence in the focus zone of the produced laser beam. The value of the maximum fluence should not be less than 10 J/mm$^2$. A maximum fluence of at least 50 J/mm$^2$ would be better. In these cases, it is ensured that a plasma formation can be reliably initiated.

In an advantageous specific embodiment, it is provided that the fluence volume has a minimum size of $1*10^{-5}$ mm$^3$. Larger fluence volumes, of at least $10^{-4}$ mm$^3$, are desirable. Corresponding to the laser beam shape, the fluence volume has in particular an ellipsoid-type shape. A ratio of longitudinal extension Z to transverse extension R of the fluence volume of a factor of at least 20 has turned out to be particularly advantageous for the laser ignition system, and a factor of at least 40 is to be sought.

The production of the pulsed laser radiation takes place using a laser source, e.g. a solid-state laser. This can optionally be pumped with a laser diode or a comparable pumped light source. The solid-state laser may have a passive Q switch. Other laser sources or oscillator-amplifier systems, such as those described in published European patent application document EP 1 888 914 A1, may also in principle be used.

A particularly advantageous specific embodiment provides that the laser beam produced by the laser source has a pulse energy of at least 1 mJ. A minimum energy of 3 mJ for the laser beam is to be sought. Here, a pulse duration of the laser beam of not less than 0.5 ns is very advantageous, and a pulse duration of at least 2 ns is even more preferable.

Overall, it has turned out to be advantageous for the beam quality $M^2$ of the pulsed laser beam to be less than 20. Particularly advantageous is a beam quality of a maximum of 10, for example 5.

In a further particularly advantageous embodiment, the intensity in the focus zone is in a range of from $10^{11}$ W/cm$^2$ to $10^{13}$ W/cm$^2$.

In addition, investigations carried out by applicant have shown that imaging errors in the focusing of the produced laser radiation, in particular diffraction effects and/or shadowing effects, also called vignetting, in the means provided according to the present invention for focusing the produced pulsed laser beam can have, in many cases, a negative influence on the capability of the focused laser beam to ignite a combustible gas mixture.

In order to avoid imaging errors, and to improve the optical imaging, care is to be taken that the means for focusing, such as a focusing lens, are preferably illuminated up to a maximum of 75% relative to the diameter, or the free aperture, or even only to 50% relative to the diameter. In particular, this results in a Strehl ratio (DIN EN ISO 14880-3) in the range of from 0.8 to 1. The Strehl ratio is a measure of the absence of imaging errors in the diffracted beam, in particular the ratio of the maximum fluence or maximum intensity of the diffracted beam to that of the undiffracted beam.

Systematic investigations have shown that, using laser ignition systems according to the present invention, fuel mixtures having a lean burning capacity of greater than $\lambda=1.5$ can be ignited, and that the lean burning boundary is shifted toward larger values as the normed fluence volume becomes larger. Due to the possibility of reliably operating internal combustion engines with gas mixtures having a high lean burning boundary in combination with a laser ignition system, pollutant emissions are reduced and the efficiency of the combustion is increased.

Further features, possible applications, and advantages of the present invention result from the following description of exemplary embodiments of the present invention, presented in the Figures of the drawing. All described or presented features, in themselves or in any combination, represent the subject matter of the present invention, independent of their formulation or presentation in the description or in the drawing.

BRIEF DESCRIPTION OF THE DRAWINGS

FIG. 3 shows a series of calculated fluence volumes for various minimum fluences.

DETAILED DESCRIPTION OF THE INVENTION

Figure 1:
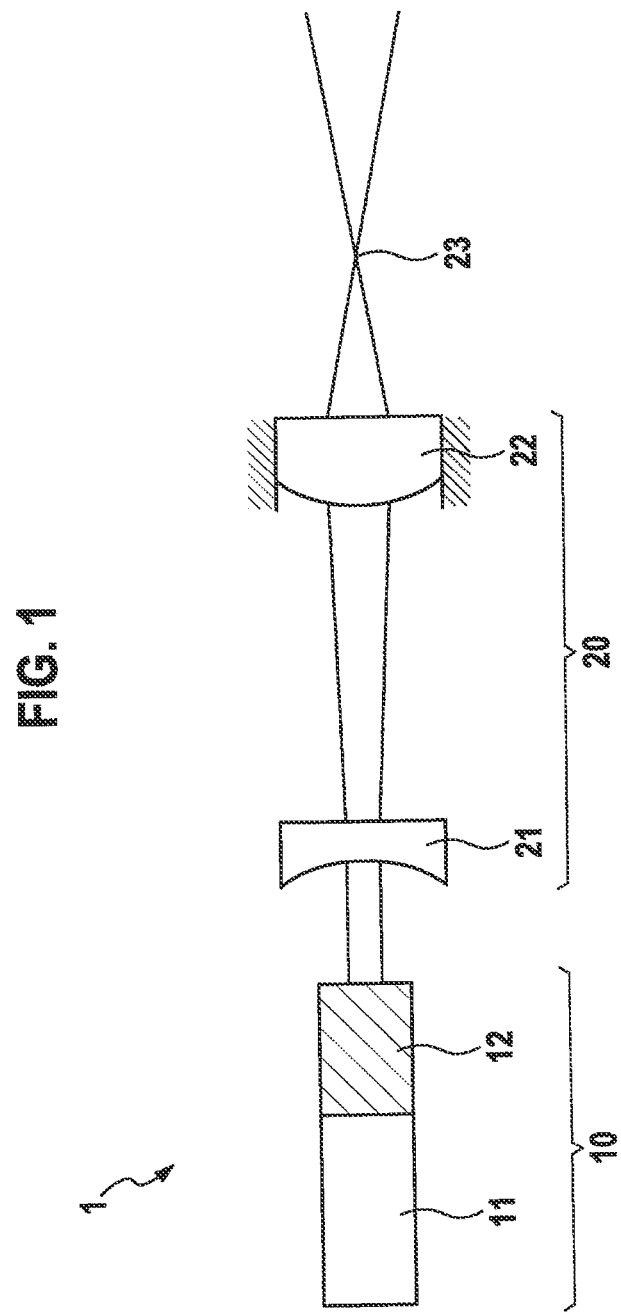
FIG. 1 shows an example of a laser ignition system according to the present invention having a diverging lens and a focusing lens.

FIG. 1 shows a schematic representation of a laser ignition system 1 made up of a means for producing a pulsed laser beam 10 and a means for focusing 20. Not shown are the associated electrical lines for supplying power to the means for producing a pulsed laser beam 10, or details of the constructive design of laser ignition system 1 as a laser spark plug, known to those skilled in the art for example from published European patent application document EP 1 519 038 A1. Optionally, means are provided for the optical transmission of the pulsed laser beam. In addition, a thermal conductor may be provided, in particular for cooling fluid, for cooling the means for producing a pulsed laser beam 1 and/or other components. Also not shown are possible means for mounting laser ignition system 1 in an internal combustion engine.

In this exemplary embodiment, to produce the pulsed laser beam a solid-state laser 11 having a passive Q switch 12 is used, which for example produces light having a wavelength of 1064 nm. A semiconductor diode laser is used as pumped light source for solid-state laser 11. As focusing means 20, a lens system is used, e.g. a telescope. This is made up of a diverging lens 21 for diverging the pulsed laser beam and a focusing lens 22 for focusing the pulsed laser beam in focus zone 23. Focusing lens 22 is illuminated to a maximum of 75% of the lens diameter. An illumination of focusing lens 22 of less than 60% of the lens diameter is recommended.

Figure 2:
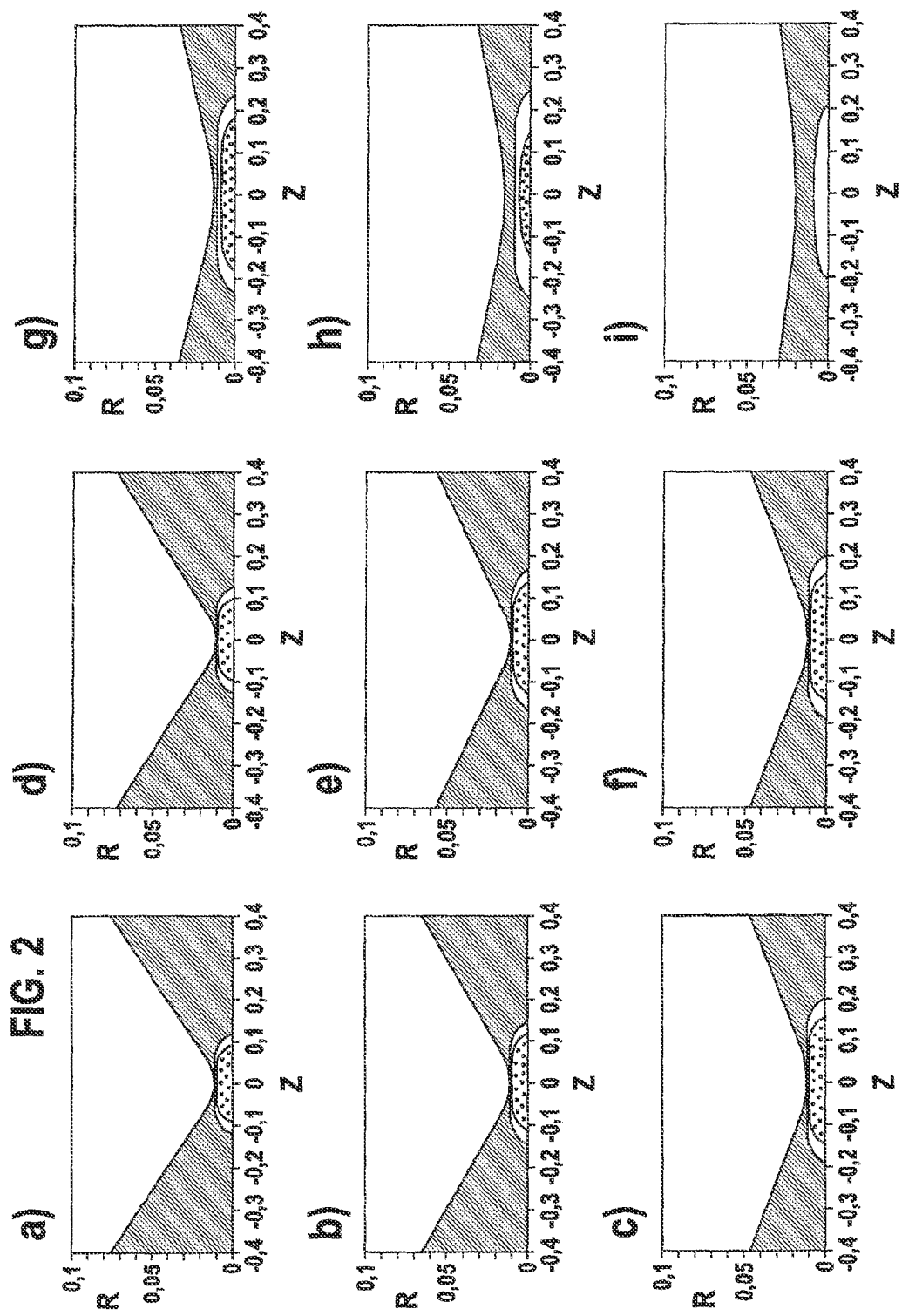
FIG. 2 shows a series of simulated beam caustics for various illumination levels of the focusing lens. The boundaries of the fluence volume, with a minimum fluence of 10 J/mm$^2$ and 15 J/mm$^2$, are shown. The radial extension (R in mm) is shown as a function of the distance (Z in mm) from the focus zone.

Different illumination levels of focusing lens 22 result in differently strong focusing of the pulsed laser beam. FIG. 2 shows the corresponding beam caustics for illuminations of 75% (FIG. 2a, d), 60% (FIG. 2b, e), 50% (FIG. 2c, f), 40% (FIG. 2g), 35% (FIG. 2h), and 30% (FIG. 2i) of the lens diameter. The beam caustics for a laser pulse energy of 9 mJ were simulated. FIGS. 2a, b, and c show beam caustics for laser beams having different beam qualities $M^2$, as were used subsequently (FIG. 3) in ignition experiments. For the simulation of the beam caustics in FIGS. 2d, e, f, g, h, and i, the same laser parameters were used as were used for the beam caustic in FIG. 2c, and only the illumination of focusing lens 22 was varied. Here, different maximum fluences resulted in focus zone 23.

For the simulation of the beam caustics, the beam propagation of the laser beam can be approximated through the mathematical description of a Gauss beam. A Gauss beam has a transverse profile according to a Gauss curve and a longitudinal profile according to a Lorentz curve.

Based on a power density distribution $$I(r, z) = I_0 \cdot \left(\frac{\omega_0}{\omega(z)}\right)^2 \cdot e^{\frac{2r^2}{\omega(z)^2}},$$

the fluence volume V is determined under the assumption of a threshold fluence or minimum fluence.

The radial distance to the z axis is defined as beam radius $\omega(z)$, at which the intensity has fallen to $1/e^2$:

$$\omega(z) = \omega_0 \cdot \sqrt{1 + \left(\frac{z}{z_0}\right)^2}.$$

The minimum beam radius, present at the beam waist (at z=0), is designated $\omega_0$.

The Rayleigh length $z_R$ is the distance along the optical axis at which the cross-sectional surface A of the beam, going out from the beam waist, has doubled in size:

$$z_R = \frac{\omega_0}{\theta_0}.$$

Using the parameters beam radius $\omega_0$ and divergence $\theta_0$ of the laser beam, the focusability of the laser radiation is described using beam quality index $M^2$:

$$M^2 = \frac{\pi}{\lambda} \cdot \theta_0 \cdot \omega_0$$

with wavelength $\lambda$.

The average power density I results from the ratio of power P to cross-sectional surface A:

$$I = \frac{P}{A}.$$

Pulse energy Q is power P multiplied by pulse duration $\tau$:

$$Q = P\tau.$$

Average energy density H, also called fluence, is the ratio of the pulse energy to cross-sectional surface A:

$$H = \frac{Q}{A}.$$

The maximum fluence $H_{max}$ results, at z=0, i.e. in the focus zone, where the cross-sectional surface $A(z=0)=\pi\omega_0^2$, as:

$$H_{max} = H(z=0) = \frac{2 \cdot Q}{\pi \cdot \omega_0^2}.$$

Using the quantities named above, loci R(z) having equal energy density or fluence can be calculated. These result as lines having the same fluence, also called isofluences, as a function of the distance to the z axis:

$$R(z) = \omega_0 \cdot \sqrt{\left(1 + \left(\frac{z}{z_R}\right)^2\right) \cdot \frac{1}{2} \cdot \ln\frac{H_{max}}{H_{Schwelle} \cdot \left(1 + \left(\frac{z}{z_R}\right)^2\right)}}$$

or $$R(z) = \omega_0 \cdot \sqrt{\left(1 + \left(\frac{z}{z_R}\right)^2\right) \cdot \frac{1}{2} \cdot \ln\frac{\frac{2 \cdot Q}{\pi \cdot \omega_0^2}}{H_{Schwelle} \cdot \left(1 + \left(\frac{z}{z_R}\right)^2\right)}}.$$

By integrating the isofluences that are equal to or greater than the minimum fluence, fluence volume FV is obtained as the volume of the integration over distance z:

$$V = 2\pi + \int_0^{z(R=0)} (R(z))^2 \, dz.$$

Thus, fluence volume $FV = f(M^2, Q, H_{Schwelle})$ is a function of beam quality $M^2$, pulse energy Q, or maximum fluence, and the minimum fluence. Using the equations stated above, for a laser crystal having known beam quality $M^2$ and pulse energy Q the beam caustic can be simulated and fluence volume FV can be calculated.

FIG. 3 shows a series of diagrams in which the resulting fluence volumes for various minimum fluences, 10 J/mm² (dashed line), 15 J/mm² (dotted line), and 20 J/mm² (solid line), are plotted against the radius of the beam waist (FIG. 3a) and against the maximum fluence (FIGS. 3b and 3c).

FIG. 3a shows that given constant pulse energy Q=12 mJ and beam quality $M^2$=6.1, by varying the focus size, or changing the radius of the beam waist, the imaging of the laser radiation is modified and influences the size of the fluence volume. Here, for a specified focus size or radius of the beam waist, the fluence volume assumes a maximum value. As the minimum fluence decreases, the fluence volume becomes larger. The maximum value of the fluence volume (shown by a point in each case in the diagram) shifts towards larger beam radii as the minimum fluence becomes smaller.

In FIGS. 3b and 3c, the fluence volume was plotted against maximum fluence $H_{max}$. As the minimum fluence decreases, 10 J/mm² (dashed line), 15 J/mm² (dotted line), and 20 J/mm² (solid line), the fluence volume becomes larger. The maximum value of the fluence volume shifts towards lower maximum fluence as the minimum fluence increases.

For FIG. 3b, the fluence volume was calculated for a pulse energy of 12 mJ and a beam quality of 6.1, as well as for a pulse energy of 9 mJ and a beam quality of 3.4. For the two pulse energy/beam quality combinations, there result identical fluence volumes as a function of the maximum fluence.

For comparison, in FIG. 3c the fluence volume is plotted against the maximum fluence for a pulse energy of 12 mJ and a beam quality of 3. By varying the pulse energy/beam quality combinations, different fluence volumes can be achieved.

The beam caustic in FIG. 2 shows the beam radius as a function of the locus in focus zone 23. Here, Z [mm] indicates the relative distance from the focus zone along the optical axis. Radius R [mm] corresponds to the extension of the Gauss-shaped laser beam, at which the intensity or fluence $1/e^2$ is equal to the maximum intensity or the maximum fluence. The maximum intensity and fluence can be set corresponding to the intended use.

In the beam caustics, the three regions are identified in which the three threshold values of $1/e^2$ of the maximum fluence (hatched region), as well as 10 J/mm² (clear region) and 15 J/mm² (dotted region), are exceeded. Through the shape and extension of the fluence volumes inside which the selected minimum fluence is exceeded, the fluence volume can be calculated for a particular illumination level of the focusing lens and the resulting focusing.

In the case of 75% illumination of the focusing lens (FIG. 2a), given a radius R of 0.01 mm and a length Z of 0.11 mm, and given a ratio of the longitudinal extension to the transverse extension of 11, for the minimum fluence of 10 J/mm² there results a fluence volume of 6.4*10⁻⁵ mm³. For the same minimum fluence and radius, in the case of 60% illumination of the focusing lens (FIG. 2b) the fluence volume is $8.6*10^{-5}$ mm$^3$, given a ratio of longitudinal extension to transverse extension of 14. In the case of 50% illumination of the focusing lens (FIG. 2c), the fluence volume is $10.6*10^{-5}$ mm$^3$, with a ratio of longitudinal extension to transverse extension of 20.

Through variation of the illumination of the lens, and the associated change in the focusing of the pulsed laser beam, and simultaneous maintenance of constant values for the minimum fluence, the maximum possible fluence volume can be determined.

The fluence volumes for FIG. 2d-i were calculated in a manner corresponding to the above sample calculation for the fluence volumes in FIG. 2a-c. For a minimum fluence of 10 J/mm$^2$, the following fluence volumes and normed fluence volumes resulted: given an illumination of 75%, fluence volume FV (75%)=$6.421*10^{-5}$ mm$^3$ and normed fluence volume nFV (75%)=0.517; FV (60%)=$8.579*10^{-5}$ mm$^3$ and nFV (60%)=0.691; FV (50%)=$10.64*10^{-5}$ mm$^3$ and nFV (50%)=0.857; FV (40%)=$12.42*10^{-5}$ mm$^3$ and nFV (40%)=1; FV (35%)=$11.5*10^{-5}$ mm$^3$ and nFV (35%)=0.926; FV (30%)=$5.35*10^{-5}$ mm$^3$ and nFV (30%)=0.431. In this example, the maximum possible fluence volume for an illumination level of 40% resulted as $12.42*10^{-5}$ mm$^3$. The norming of the fluence volume was done to this value.

FIG. 2 clearly shows that the fluence volume increases as the focusing becomes less sharp. The two series, FIG. 2a-c and FIG. 2d-i, show that the fluence volume is primarily a function of the illumination of lens system 20, and secondarily is a function of beam quality M$^2$ or of the set maximum fluence in focus zone 23.

The following relationships can be formulated:

If, given constant pulse energy Q and beam quality M$^2$, the imaging of the laser beam is modified in such a way that there results a variation in the focus size, i.e. modification of radius $\omega_0$ of the beam waist, in this way the size of fluence volume FV is influenced. Here, for a specified focus size, fluence volume FV assumes a maximum value.

Given a decreasing fluence threshold, or minimum fluence, fluence volume FV becomes larger. Given a smaller fluence threshold, or minimum fluence, the maximum value of the fluence volume shifts towards larger beam radii $\omega_z$.

Figure 4:
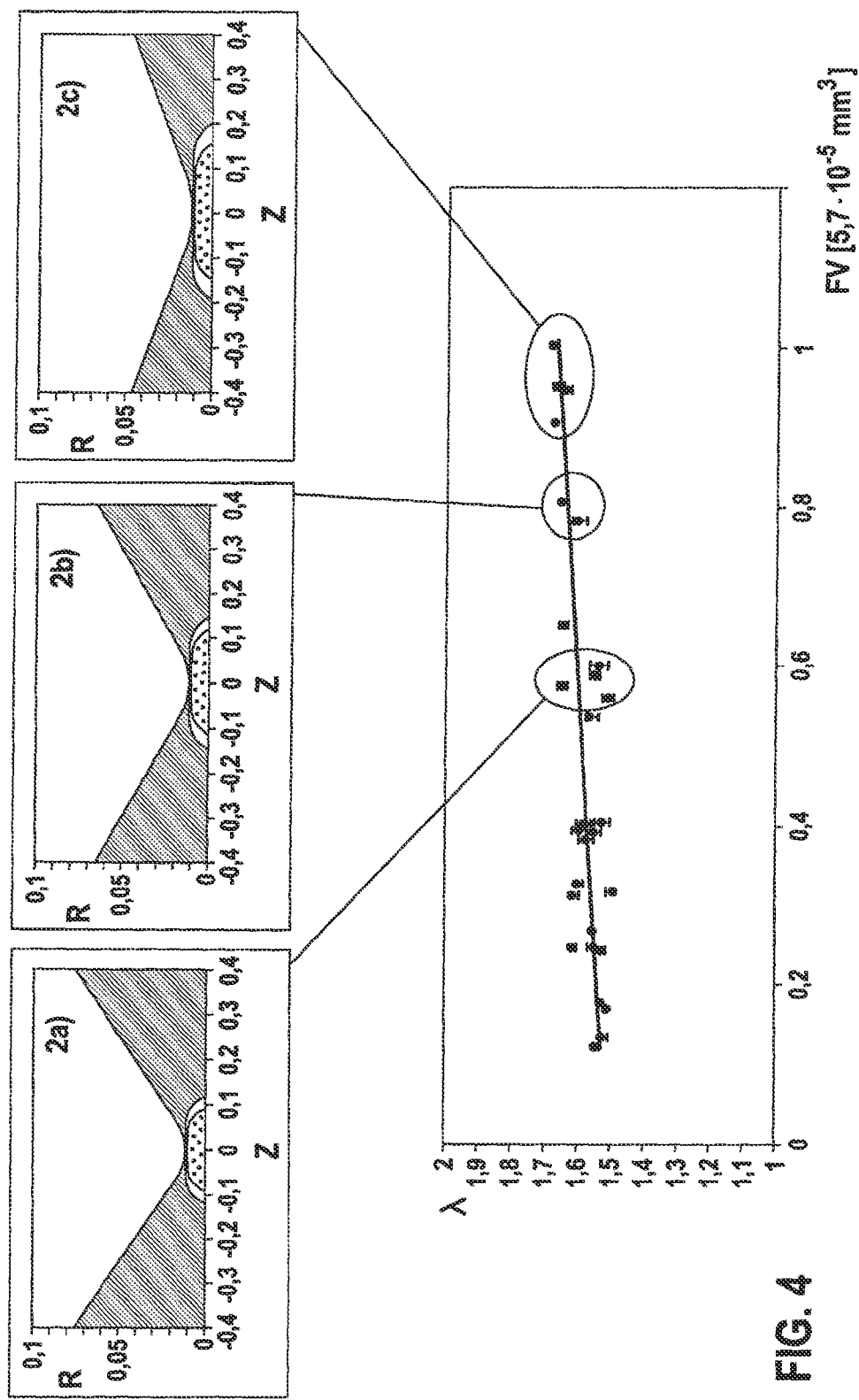
FIG. 4 shows the lean burning boundary ($\lambda$) as a function of the fluence volume (FV) for various pulse energies (3 mJ, 5 mJ, 7 mJ, 9 mJ) and illumination levels of the focusing lens (75%, 60%, 50%).

The lean burning boundary at which laser ignition system 1 can reliably ignite a lean combustible fuel mixture is a quality feature for laser ignition system 1 in an internal combustion engine. In FIG. 4, lean burning boundary λ of a methane-air mixture is plotted as a function of the fluence volume (FV). For the three illumination levels of focusing lens 22, corresponding to the beam caustics shown in FIG. 2a-c, the lean burning boundary λ was determined for each of the pulse energies 3 mJ, 5 mJ, 7 mJ, and 9 mJ. For this purpose, during ignition trials in a flow chamber the probability of ignition of a methane-air mixture as a function of lean burning level λ was measured. For each lean burning level λ, 30 ignition processes were initiated in the methane-air mixture at a pressure of 3 bar and a flow speed of 5 m/s, and the successful ignitions were registered. The lean burning boundary corresponds to the λ at which the probability of ignition has decreased to 95%.

For each pulse energy level and illumination level of focusing lens 22, the beam caustic was simulated, and from this the fluence volume was calculated for a minimum fluence of 15 J/mm$^2$. The greatest possible fluence volume, at $5.7*10^{-5}$ mm$^3$, was achieved in this trial at a focusing lens illumination of 50% and a pulse energy of 9 mJ.

FIG. 4 shows that the lean burning boundary λ increases with the fluence volume (FV). Thus, when laser beam features, pulse energy, and beam quality M$^2$ are held constant, the lean burning capacity improves solely via the parameter normed fluence volume (nFV), i.e. via an optimized choice of the focusing. The determined lean burning boundaries for the beam caustics from FIGS. 2a, 2b, and 2c are marked in the graph.

Figure 5:
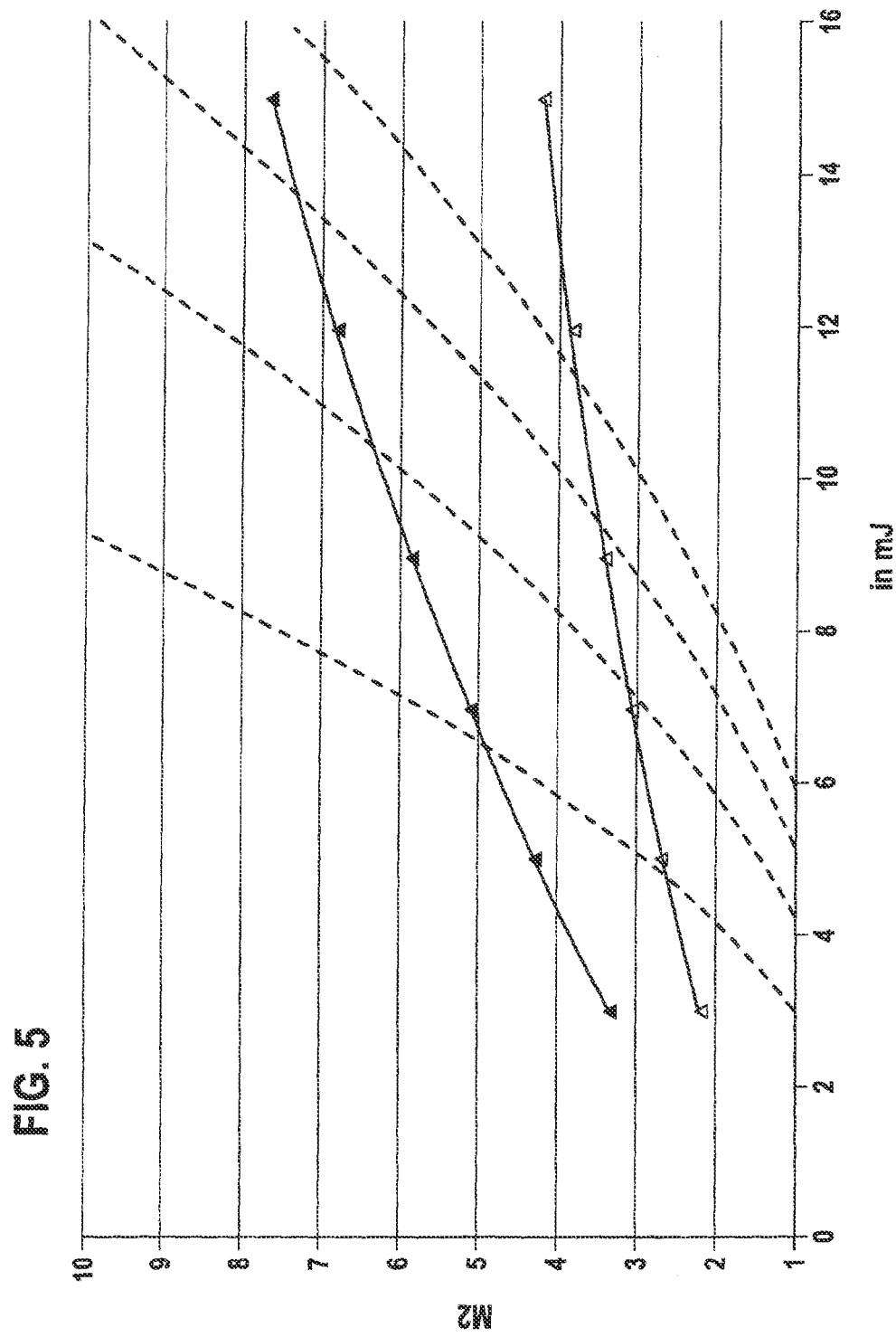
FIG. 5 shows the relation between beam quality $M^2$, pulse energy Q, and fluence volume FV for various laser crystal lengths and minimum fluences.

FIG. 5 shows fluence volume FV as a function of beam quality M$^2$ and pulse energy Q. As examples, operating points are shown for two laser crystals having a length of 10 mm (filled triangles) and a length of 30 mm (open triangles). For both laser crystals, the initial transmission of the saturable absorber was at $T_0$=30%. The dashed lines are calculated values for the isochors of the fluence volume, fluence volume FV increasing from left to right. From left to right, the dashed lines correspond to fluence volumes of: FV=$2*10^{-5}$ mm$^3$; FV=$4*10^{-5}$ mm$^3$; FV=$6*10^{-5}$ mm$^3$; FV=$8*10^{-5}$ mm$^3$, where in each case a minimum fluence of 15 J/mm$^2$ was selected.

FIG. 5 clearly shows that, given constant beam quality M$^2$, fluence volume FV increases as pulse energy Q increases. Given constant pulse energy Q, beam quality M$^2$ must improve, i.e. must assume smaller values, so that fluence volume FV will become larger. Identical fluence volumes FV can be produced via various combinations of pulse energy Q and beam quality M$^2$.

What is claimed is:

1. A laser ignition system, comprising:
    at least one unit for producing a pulsed laser beam; and
    at least one unit for focusing the produced pulsed laser beam onto a focus zone in order to ignite a combustible gas mixture;
    wherein the laser ignition system is configured to produce a pulsed laser beam having a normed fluence volume greater than 0.1, a fluence volume being given by a volume in which a minimum fluence is everywhere exceeded, and the normed fluence volume resulting from the fluence volume normed to a maximum possible fluence volume, and the minimum fluence assuming a value in a range of from 10 J/mm$^2$ to 20 J/mm$^2$.

2. The laser ignition system as recited in claim 1, wherein the maximum possible fluence volume is a maximum fluence volume that can theoretically be achieved through variation of a numerical aperture of the focusing while simultaneously holding constant the minimum fluence and laser beam features including pulse energy and beam quality M$^2$.

3. The laser ignition system as recited in claim 2, wherein the minimum fluence is given by a value in the range of from 1/10 to 1/2 of a maximum fluence of the pulsed laser beam in the focus zone.

4. The laser ignition system as recited in claim 2, wherein a maximum fluence of the pulsed laser beam in the focus zone is not less than 10 J/mm$^2$.

5. The laser ignition system as recited in claim 2, wherein a maximum fluence of the pulsed laser beam in the focus zone is between 10 J/mm$^2$ and 120 J/mm$^2$.

6. The laser ignition system as recited in claim 2, wherein the fluence volume has a minimum size of $1*10^{-5}$ mm$^3$.

7. The laser ignition system as recited in claim 2, wherein a ratio between a longitudinal extension and a transverse extension of the fluence volume is not smaller than a factor of 20.

8. The laser ignition system as recited in claim 7, wherein the ratio between a longitudinal extension and a transverse extension of the fluence volume is between a factor of 20 and a factor of 60.

9. The laser ignition system as recited in claim 2, wherein at least one of:

the unit for producing the pulsed laser beam is at least one of a diode-pumped and passively Q-switched solid-state laser; and the unit for focusing the pulsed laser beam includes a lens system.

10. The laser ignition system as recited in claim 9, wherein the lens system is illuminated at a maximum level of 75% of free aperture of the lens system so that a Strehl ratio of the lens system of from 0.8 to 1 results.

11. The laser ignition system as recited in claim 7, wherein a pulse energy of the pulsed laser beam is not less than 1 mJ.

12. The laser ignition system as recited in claim 11, wherein the pulse energy of the pulsed laser beam is between 10 mJ and 25 mJ.

13. The laser ignition system as recited in claim 7, wherein a pulse duration of the pulsed laser beam is not less than 0.5 ns.

14. The laser ignition system as recited in claim 13, wherein a pulse duration of the pulsed laser beam is between 0.5 ns and 10 ns.

15. The laser ignition system as recited in claim 7, wherein the pulsed laser beam has a beam quality $M^2$ less than 20.

16. The laser ignition system as recited in claim 2, wherein the pulsed laser beam in the focus zone has a maximum intensity greater than $10^{11}$ W/cm$^2$.

17. The laser ignition system as recited in claim 2, wherein the laser ignition system is a laser spark plug having at least one of an electrical line, an optical line, and a thermal line, wherein the thermal line is for cooling fluid.

18. The laser ignition system as recited in claim 1, wherein the laser ignition system is configured to produce a pulsed laser beam having a normed fluence volume greater than 0.3.

19. The laser ignition system as recited in claim 1, wherein the laser ignition system is configured to produce a pulsed laser beam having a normed fluence volume greater than 0.5.

* * * * *